United States Patent Office 3,215,685
Patented Nov. 2, 1965

3,215,685
STABILIZED CYTOCHROME c AND PROCESS FOR PREPARING THE SAME
Kazuo Nakanishi, Hamako Katano, and Hiroshi Mizushima, Tokyo, Japan, assignors to Sankyo Company, Limited, Tokyo, Japan
No Drawing. Filed Feb. 21, 1962, Ser. No. 174,668
Claims priority, application Japan, Feb. 28, 1961, 36/6,140
5 Claims. (Cl. 260—112)

This invention relates to a new and useful process of stabilizing cytochrome c, and to a new composition of matter consisting of cytochrome c stabilized against optical and thermal decomposition.

As is generally known, cytochrome c is a red protein containing heme, cytochrome c is an essential factor in the respiratory mechanism of the cells of almost all the living matters in nature such as animals, plants and microorganisms. Biochemically, cytochrome c occupies an important postion in the respiratory enzyme system in organisms and plays a part as the rate-determining factor in the oxidation process of tissues in organisms. Attempts have been made to supply cytochrome c therapeutically to cure diseases that seem to be caused by insufficient respiratory oxidation of the cell. Cytochrome c has been shown to be therapeutically useful in the treatment of gas and drug intoxifications, arteriosclerosis, angina pectoris, dyspnea from pneumatitis, heart diseases, apoplexy and the like.

Cytochrome c preparations heretofore available, either in liquid or in dry form, however, become discolored on standing by light and heat and the discoloration varies from bright orange red color of reduced-form cytochrome c to dark brownish red color of oxidized-form one. Moreover, their enzymatic activities are decreased on storage under the influences of light and heat. It is therefore necessary and desirable, especially in medicinal use, which requires high purity as well as homogeneity of quality, to stabilize cytochrome c preparations enough to maintain the appearance and activity unchanged even after prolonged storage.

It is an object of this invention to provide means for overcoming the aforementioned instability of cytochrome c to make available the preparation with unchanged appearance and stability for a long period of time. It is another object of this invention to provide as an improved composition of matter a cytochrome c stabilized against light and heat.

Other objects, as well as aspects and advantages, of the invention are apparent from this disclosure and the appended claims.

According to this invention the aforementioned and other objects can be achieved by incorporating saccharides, peptides or basic amino acids with cytochrome c.

In carrying out the process of this invention, a stabilizing agent selected from the group as mentioned above is added to an aqueous solution of cytochrome c. If necessary, the resulting solution is sterilized and freeze-dried for the final cytochrome c preparation. It is preferable to add ascorbic acid prior to the incorporation of the stabilizer to an aqueous solution of cytochrome c in order to convert oxidized-form cytochrome c contained or possibly present to reduced-form cytochrome c, although the mixed-form cytochrome c is also stabilized by the incorporation of the stabilizer. The adequate amount of ascorbic acid incorporated is at least 0.1% by weight of cytochrome c, but preferably, it is from about 0.1% to about 5.0% by weight of cytochrome c. Addition of ascorbic acid in amount over 5.0% by weight of cytochrome c may be allowable, but it does not produce any superior result. The stabilizing agent in powder form may be added to the cytochrome c solution but it is preferable to add the stabilizing agent in form of an aqueous solution prepared in advance by dissolving the same in water.

As the stabilizing agents used in the process and the composition of matter according to this invention may be used a wide variety of saccharides, peptides and basic amino acids. Illustration of compounds which are employed according to this invention include: among saccharides, hexoses, such as d-glucose, d-galactose, d-fructose, d-mannose and L-sorbose, disaccharides, such as sucrose and maltose, and hexose derivatives, such as d-sorbit and d-mannit; among basic amino acids, histidine, lysine and the like; and among peptides, dipeptides, such as glycylglycine, and tripeptides, such as glycylglycylglycine, alanylglycylglycine and leucylglycylglycine. The aforementioned compounds, however, should be understood not to limit the scope of stabilizing agents employed in this invention. These stabilizing agents may be used in amount between about 10% and about 100% by weight of the amount of cytochrome c, preferably in amount between about 50% and about 100% by weight of cytochrome c. The invention will now be described by several examples, it being understood that these examples are given by way of illustration and not by way of limitation and many changes may be effected without affecting the scope and spirit of this invention as recited in the appended claims.

The high stabilizing effect of the stabilizing agents on cytochrome c according to this invention is indicated by the data of the following tables. The results are those obtained by the after-described experimental procedures.

To a solution of cytochrome c, converted to the reduced-form by addition of ascorbic acid in an amount 0.1% by weight of cytochrome c, is added a stabilizing agent in amount by weight 20%, 50% and 100% of the amount of cytochrome c respectively. The resulting solution is freeze-dried at a low temperature, followed by allowing to stand at 37° C. for 30 days. The freeze-dried cytochrome c preparation thus aged is then dissolved in water and the aqueous solution is subjected to measurement of absorption spectrum at a wave length of 550 m$\mu$ (visible light) by means of a spectrophotometer. Absorptions at the same wave length as above of the aqueous solution subjected to forced reduction with hydrosulfite and of one subjected to forced oxidation with ferricyanate are coincidently measured to determine the remaining amount (percent) of reduced-form cytochrome c. The results are indicated in Table 1.

EXAMPLE 1

To 100 ml. of an aqueous solution of yeast cytochrome c in a concentration of 20 mg. per ml., the content of cytochrome c being measured by the optical method, is added a solution of 400 mg. of glycylglycine in distilled water to a total volume of 200 ml. The resulting solution is subjected to filtration on a Chamberland's filter and the filtrate is aseptically divided into one-milliliter solutions, which are freeze-dried without applying heat.

EXAMPLE 2

To 50 ml. of an aqueous solution of beef heart cytochrome c in a concentration of 40 mg. per ml., the content of cytochrome c being measured by the same method as in the previous example, is added an aqueous solution containing 2 mg. of ascorbic acid, followed by stirring well and standing for a while. To the resulting solution is then added an aqueous solution containing 1000 mg. of glucose to a total volume of 100 ml. The resulting solution is treated in the same way as in Example 1.

EXAMPLE 3

As in the previous example, an aqueous solution containing 100 mg. of ascorbic acid is added to 100 ml. of an aqueous solution of yeast cytochrome c in a concentration of 20 mg. per ml., followed by addition of an aqueous solution containing 2000 mg. of lysine to a total volume of 200 ml. The resulting solution is treated in the same way as in Example 1.

EXAMPLE 4

To 100 ml. of an aqueous solution of yeast cytochrome c in a concentration of 40 mg. per ml., the content of cytochrome c being measured by the optical method, is added an aqueous solution containing 4 mg. of ascorbic acid, followed by stirring well and standing for a while. To the resulting solution is then added an aqueous solution containing 800 mg. of sucrose to a total volume of 200 ml. The resulting solution is treated in the same way as in Example 1.

EXAMPLE 5

To 50 ml. of an aqueous solution of yeast cytochrome c in a concentration of 20 mg. per ml., the content of cytochrome c being measured by the same method as in the previous example, is added a solution of 500 mg. of glycylglycylglycine in distilled water to a total volume of 100 ml. The resulting solution is treated in the same way as in Example 1.

EXAMPLE 6

To 100 ml. of an aqueous solution of beef heart cytochrome c in a concentration of 20 mg. per ml., the content of cytochrome c being measured by the optical method, is added an aqueous solution containing 20 mg. of ascorbic acid, followed by stirring well and standing for a while. To the resulting solution is then added an aqueous solution containing 2000 mg. of d-sorbit to a total volume of 200 ml. and the resulting solution is treated in the same way as in Example 1.

EXAMPLE 7

To 50 ml. of an aqueous solution of yeast cytochrome c in a concentration of 40 mg. per ml., the content of cytochrome c being measured by the optical method, is added a solution of 2000 mg. of d-fructose in distilled water to a total volume of 100 ml. The resulting solution is treated in the same way as in Example 1.

*Table 1*

STABILIZATION OF YEAST CYTOCHROME C

| Amount incorporated (percent) | 20 | 50 | 100 |
|---|---|---|---|
| | Amount remaining in percent of reduced form cytochrome c | | |
| Stabilizing agent: | | | |
| d-Glucose | 60 | 68 | 73 |
| d-Galactose | 71 | 85 | 85 |
| d-Fructose | 65 | 70 | 75 |
| l-Sorbose | 57 | 68 | 73 |
| Sucrose | 70 | 85 | 88 |
| d-Sorbit | 58 | 70 | 75 |
| Histidine | 40 | 50 | 55 |
| Lysine | 45 | 65 | 70 |
| Glycylglycine | 58 | 83 | 82 |
| Glycylglycylglycine | 60 | 85 | 85 |
| Alanylglycylglycine | 60 | 85 | 85 |
| Control (no stabilizing agent) | 30 | | |

STABILIZATION OF BEEF HEART CYTOCHROME C

| Amount incorporated (percent) | 20 | 50 | 100 |
|---|---|---|---|
| | Amount remaining in percent of reduced form cytochrome c | | |
| Stabilizing agent: | | | |
| d-Mannose | 60 | 72 | 75 |
| Maltose | 72 | 85 | 90 |
| d-Mannit | 55 | 61 | 65 |
| Lysine | 65 | 76 | 80 |
| Glycylglycin | 75 | 87 | 92 |
| Leucylglycylglycine | 74 | 85 | 92 |
| Control (no stabilizing agent) | 50 | | |

A. The freeze-dried cytochrome c preparations obtained as in experiments above described are stored at 45° C. for 30 days and the resulting cytochrome c preparations are dissolved in water.

B. The same freeze-dried cytochrome c preparations as in A are stored at 0° C. for 30 days and the resulting cytochrome c preparations are dissolved in water.

The remaining enzymatic activities of the aqueous solution of (A) are measured in comparison with those of the aqueous solution of (B) by means of a Warburg mannometer with Green Brei as the cytochrome oxidase and ascorbic acid as the substrate. The results are shown in Table 2.

*Table 2*

STABILIZATION OF YEAST CYTOCHROME C

| Amount incorporated (percent) | 20 | 50 | 100 |
|---|---|---|---|
| | Remaining enzymatic activity in percent of aqueous solution A if remaining enzymatic activity of solution B is valued as 100% | | |
| Stabilizing agent: | | | |
| d-Glucose | 65 | 66 | 68 |
| d-Galactose | 85 | 88 | 89 |
| d-Fructose | 75 | 80 | 80 |
| l-Sorbose | 60 | 64 | 66 |
| Sucrose | 85 | 88 | 89 |
| d-Sorbit | 60 | 65 | 65 |
| Histidine | 75 | 80 | 85 |
| Lysine | 70 | 73 | 80 |
| Glycylglycine | 90 | 90 | 93 |
| Glycylglycylglycine | 90 | 90 | 93 |
| Alanylglycylglycine | 89 | 89 | 90 |
| Control (no stabilizing agent) | 50 | | |

STABILIZATION OF BEEF HEART CYTOCHROME C

| Amount incorporated (percent) | 20 | 50 | 100 |
|---|---|---|---|
| | Remaining enzymatic activity in percent of aqueous solution A if remaining enzymatic activity of solution B is valued as 100% | | |
| Stabilizing agent: | | | |
| d-Mannose | 80 | 82 | 84 |
| Maltose | 90 | 90 | 94 |
| d-Mannit | 72 | 75 | 75 |
| Lysine | 83 | 86 | 88 |
| Glycylglycine | 90 | 90 | 95 |
| Leucylglycylglycine | 91 | 91 | 95 |
| Control (no stabilizing agent) | 70 | | |

We claim:

1. A process of stabilizing cytochrome c, which comprises adding to an aqueous solution of cytochrome c about 10–100% by weight, calculated on the amount of cytochrome c, of a stabilizing agent selected from the group consisting of (a) saccharides selected from the group consisting of d-glucose, d-galactose, d-fructose, d-mannose, l-sorbose, sucrose, maltose, d-sorbit and d-mannit, (b) peptides selected from the group consisting of glycylglycine, glycylglycylglycine, alanylglycylglycine and leucylglycylglycine, and (c) basic amino acids selected from the group consisting of histidine and lysine.

2. A process as claimed in claim 1, wherein about between 0.1 and 5.0% by weight of ascorbic acid is added to said aqueous solution prior to the addition of said stabilizing agent.

3. A process of stabilizing cytochrome c, which comprises adding to an aqueous solution of cytochrome c about 0.1 to 5.0% by weight of ascorbic acid, admixing thereafter the solution with about 10–100% by weight, calculated on the amount of cytochrome c, of a stabilizing agent selected from the group consisting of (a) saccharides selected from the group consisting of d-glucose, d-galactose, d-fructose, d-mannose, l-sorbose, sucrose, maltose, d-sorbit and d-mannit, (b) peptides selected from the group consisting of glycylglycine, glycylglycylglycine, alanylglycylglycine and leucylglycylglycine, and (c) basic amino acids selected from the group consisting of histidine and lysine, and freeze-drying the solution thus obtained.

4. As a new composition of matter, a heat- and light-stable aqueous solution essentially consisting of water, cytochrome c and about between 10–100% by weight, calculated on the amount of cytochrome c, of a stabilizing agent selected from the group consisting of (a) saccharides selected from the group consisting of d-glucose, d-galactose, d-fructose, d-mannose, l-sorbose, sucrose, maltose, d-sorbit and d-mannit, (b) peptides selected from the group consisting of glycylglycine, glycylglycylglycine, alanylglycylclycine and leucylglycylglycine, and (c) basic amino acids selected from the group consisting of histidine and lysine.

5. As a new composition of matter, a heat- and light-stable solid substance essentially consisting of cytochrome c and about 10–100% by weight, calculated on the amount of cytochrome c, of a stabilizing agent selected from the group consisting of (a) saccharides selected from the group consisting of d-glucose, d-galactose, d-fructose, d-mannose, l-sorbose, sucrose, maltose, d-sorbit and d-mannit, (b) peptides selected from the group consisting of glycylglycine, glycylglycylglycine, alanylglycylglycine and leucylglycylglycine, and (c) basic amino acids selected from the group consisting of histidine and lysine.

References Cited by the Examiner

UNITED STATES PATENTS 3,057,781   10/62   Mace _____ 260—112 X

OTHER REFERENCES

Kolomichenko, Chemical Abstracts, vol. 53, p. 6315 (1959).

Schmidt, Chemical Abstracts, vol. 51, pp. 8923–24 (1957).

Eggleton, Chemical Abstracts, vol. 47, p. 620 (1953).

Bigwood, Chemical Abstracts, vol. 30, p. 495 (1936).

Webster's Third New International Dictionary (1961), p. 567.

WILLIAM H. SHORT, *Primary Examiner.*

LEON ZITVER, *Examiner.*